(12) United States Patent
Liu et al.

(10) Patent No.: US 7,534,504 B2
(45) Date of Patent: May 19, 2009

(54) FINE-GRAINED RARE EARTH ACTIVATED ZINC SULFIDE PHOSPHORS FOR ELECTROLUMINESCENT DISPLAYS

(75) Inventors: Guo Liu, Brampton (CA); Alexander Kosyachkov, Mississauga (CA); Yue (Helen) Xu, Burlington (CA); James Alexander Stiles, Toronto (CA)

(73) Assignee: Ifire IP Corporation, Fort Saskatchewan, Alberta (CA)

( * ) Notice: Subject to any disclaimer, the term of this patent is extended or adjusted under 35 U.S.C. 154(b) by 410 days.

(21) Appl. No.: 10/649,282

(22) Filed: Aug. 27, 2003

(65) Prior Publication Data

US 2004/0161631 A1    Aug. 19, 2004

Related U.S. Application Data

(60) Provisional application No. 60/406,661, filed on Aug. 29, 2002.

(51) Int. Cl.
*C09K 11/56* (2006.01)
*H01J 1/62* (2006.01)
*G11B 11/105* (2006.01)

(52) U.S. Cl. .............. 428/690; 428/917; 428/332; 313/503; 313/509; 313/512; 252/301.6 S; 257/100

(58) Field of Classification Search .............. 428/690, 428/917, 332; 257/100, 40; 252/301.6 S; 313/503, 506, 512, 502, 486, 509; 250/337
See application file for complete search history.

(56) References Cited

U.S. PATENT DOCUMENTS

| 4,874,985 | A | * | 10/1989 | Hase et al. ............... 313/487 |
| 4,937,150 | A | | 6/1990 | Tsukada |
| 5,656,815 | A | * | 8/1997 | Justus et al. ............... 250/337 |
| 5,837,320 | A | * | 11/1998 | Hampden-Smith et al. ....... 427/248.1 |
| 6,241,819 | B1 | | 6/2001 | Bhargava et al. |
| 2004/0170864 | A1 | * | 9/2004 | Liu ........................ 428/690 |

FOREIGN PATENT DOCUMENTS

| EP | 0 258 908 | 3/1988 |
| EP | 0 622 439 | 11/1994 |
| JP | 08138866 | 5/1996 |
| JP | 11-293241 | 10/1999 |

* cited by examiner

*Primary Examiner*—D. Lawrence Tarazano
*Assistant Examiner*—Camie S Thompson
(74) *Attorney, Agent, or Firm*—Fay Sharpe LLP

(57) ABSTRACT

An improved fine grained zinc sulfide phosphor is provided for use in ac electroluminescent displays. The fine-grained zinc sulfide phosphor film exhibits improved luminance and may be used in conjunction with a structure or substance to minimize or prevent reaction of the fine grained phosphor with oxygen. The invention is particularly applicable to zinc sulfide phosphors used in electroluminescent displays that employ thick dielectric layers subject to high processing temperatures to form and activate the phosphor films.

31 Claims, 9 Drawing Sheets

FINE-GRAINED RARE EARTH ACTIVATED ZINC SULFIDE PHOSPHORS FOR ELECTROLUMINESCENT DISPLAYS

The present application claims priority from U.S. Provisional patent application No. 60/406,661, filed Aug. 29, 2002.

FIELD OF THE INVENTION

The present invention relates to improving the luminance and the operating stability of phosphors used for full color ac electroluminescent displays employing thick film dielectric layers with a high dielectric constant. More specifically, the invention relates to an improved thin film fine grained zinc sulfide phosphor in combination with a structure and/or substance to minimize or prevent reaction of the fine grained phosphor with oxygen for use in electroluminescent displays.

BACKGROUND OF THE INVENTION

Thick film dielectric structures as exemplified by U.S. Pat. No. 5,432,015 are known and exhibit superior characteristics to that of traditional TFEL displays. High performance red, green and blue phosphor materials have been developed for use with thick film dielectric structures to provide increased luminance performance. These phosphor materials include europium activated barium thioaluminate based materials for blue emission, terbium activated zinc sulfide, manganese activated magnesium zinc sulfide or europium activated calcium thioaluminate based materials for green emission, as well as traditional manganese activated zinc sulfide that can be appropriately filtered for red emission.

The thin film phosphor materials used for red, green and blue sub-pixels must be patterned using photolithographic techniques employing solvent solutions for high resolution displays. Traces of these solutions remaining in the display following photolithographic processing together with reaction of moisture or oxygen present in the processing environment may react chemically with certain phosphor materials that are sensitive to oxidation or hydrolysis reactions to cause performance degradation of the completed display. Continued chemical reactions during operation of the display may cause continued performance degradation thereby shortening the life of the display.

To overcome such performance degradation problems, researchers have proposed the use of various materials in conjunction with phosphor materials including zinc sulfide rare earth metal activated phosphors as disclosed for example in U.S. Pat. Nos. 6,048,616 and 6,379,583.

Ihara et al., (*Journal of the Electrochemical Society* 149 (2002) pp H72-H75) discloses the use of glass to encapsulate nanocrystalline terbium activated zinc sulfide grains. Such encapsulated nanocrystalline grains led to substantially increased photoluminescence and cathodoluminescence as compared to bulk terbium activated zinc sulfide that was attributed to an increase in the transition probability for the decay of the terbium atom from its excited state. The glass coating prevented loss of sulfur and terbium relative to the zinc content of the particles under electron bombardment, whereas uncoated particles with the same diameter showed a significant loss of sulfur and some loss of terbium under the same conditions. The sulfur loss was due to displacement of sulfur from the zinc sulfide by oxygen. However, this reference teaches that the glass coating method is not applicable to the coating of bulk materials such as deposited films and therefore the use of the coated powders for electroluminescent applications was not considered where the factors controlling luminance are different than they are for photoluminescence or cathodoluminescence. Also, a reduction in the grain size of manganese activated zinc sulfide phosphor films in electroluminescence applications did not facilitate an improvement in luminance, but rather decreased the luminance, showing that a reduction in grain size does not necessarily lead to increased luminance.

Mikami et al., (Proceedings of the 6$^{th}$ International Conference on the Science and Technology of Display Phosphors (2000) pp. 61-4) disclose the use of sputtered silicon nitride layers to encapsulate a terbium activated zinc magnesium sulfide thin film phosphor layer in an electroluminescent device to improve the emission spectrum for use as a green phosphor. Luminosity or luminance stability of the device was not addressed.

J. Ohwaki et al., (Review of the Electrical Communications laboratories Vol. 35, 1987) disclose the use of chemical vapour deposition to deposit silicon nitride on an electron beam deposited terbium activated zinc sulfide phosphor film to improve its luminance stability. The silicon nitride layer was to provide a barrier to prevent moisture incursion into the conventional type of zinc sulfide phosphor. Further, chemical vapour deposition processes are difficult to adapt to large area electroluminescent displays for television and other large format display applications and suffer cost and safety disadvantages associated with the handling of volatile precursor chemicals and remediation of effluent gases required for the processes.

U.S. Pat. No. 4,188,565 discloses the use of oxygen-containing insulator silicon nitride layers for use with a manganese activated zinc sulfide phosphor where the oxygen content in the silicon nitride is between 0.1 and 10 mole percent. It is taught in this patent that silicon nitride that does not contain oxygen is unsatisfactory because it does not form a sufficiently strong bond with the phosphor material to prevent delamination. The above noted patent further teaches deposition of the oxygen doped silicon nitride by the use of a sputtering process in a low-pressure atmosphere of nitrogen or a nitrogen-argon mixture containing nitrous oxide. A second insulator layer in combination with the oxygen doped silicon nitride layer is also used to prevent degradation of the phosphor material due to reaction with ambient moisture.

U.S. Pat. No. 4,721,631 discloses deposition of a silicon nitride layer or a silicon oxynitride layer on top of a manganese activated zinc sulfide phosphor film using a plasma chemical vapour deposition method. In this method the process gas for the deposition includes nitrogen and silane rather than ammonia and silane in order to exclude hydrogen from the process since hydrogen can react with sulfur bearing phosphor materials to form hydrogen sulfide, thereby degrading the phosphor performance. It is disclosed that silicon nitride layers deposited using the ammonia free plasma chemical vapour deposition process enable equivalent performance results with manganese activated zinc sulfide phosphors to those obtained with sputtered silicon nitride layers, whereas silicon nitride layers deposited using ammonia yield inferior results.

U.S. Pat. No. 4,880,661 discloses that a manganese-activated zinc sulfide phosphor film cannot successfully be deposited on top of a silicon nitride film using chemical vapour deposition due to its hydrogen concentration. The hydrogen migrates into the phosphor during thermal annealing of the deposited phosphor, causing degradation by loss of sulfur due to reaction with the hydrogen.

U.S. Pat. No. 4,897,319 discloses an electroluminescent device with a double-stack insulator on either side of a manganese-activated zinc sulfide phosphor layer to improve the luminance and energy efficiency of the device. One of the stack members is silicon oxynitride and the other is barium tantalate. The order of the members are reversed on the two sides with the silicon oxynitride layer in contact with the phosphor film on one side and the barium tantalate oxide layer in contact with the phosphor on the opposite side.

U.S. Pat. No. 5,314,759 discloses an electroluminescent display that includes a terbium activated zinc sulfide phosphor layer deposited by Atomic Layer Epitaxy (ALE) and a layer of samarium doped zinc aluminum oxide.

U.S. Pat. No. 5,496,597 discloses a method for making a multilayer alkaline-earth sulfide-metal oxide structure for electroluminescent displays. The phosphor layer has dielectric layers on each side composed of various materials including aluminum oxide.

U.S. Pat. No. 5,598,059 discloses various phosphors including zinc sulfide doped with terbium and having insulating layers of various materials including aluminum oxide.

U.S. Pat. No. 5,602,445 discloses various phosphors with layered construction and having insulating and buffer layers about the phosphor. In one aspect, zinc sulfide is used to sandwich a calcium chloride or strontium chloride rare earth activated phosphor.

U.S. Pat. No. 5,644,190 discloses the use of insulator layers of silicon oxide on both sides of phosphor layers of various materials including manganese activated zinc gallium oxide and zinc cadmium sulfide activated with silver and indium oxide.

WO 00/70917 discloses an electroluminescent laminate that includes a rate earth activated zinc sulfide material having a diffusion barrier layer of zinc sulfide.

While the aforementioned references and patents may teach the use of a conventional large grained rare earth activated zinc sulfide phosphor with certain types of "barrier" or "insulator" materials" for the purpose of preventing reaction of the phosphor with water from the ambient environment or some other "stabilizing" type function, there remains a need to provide an improved zinc sulfide rare earth activated phosphor that has both improved luminance and a long operating life with minimal degradation.

SUMMARY OF THE INVENTION

The present invention is directed to a thick film electroluminescent device employing a thin film zinc sulfide phosphor doped with a rare earth activator species that has an improved luminance and a long operating life with minimal luminance degradation. Conventional teachings in EL technology utilize phosphors with a large grain size in order to achieve good performance. In contrast, in the present invention an improved rare earth activated zinc sulfide phosphor is achieved by making the zinc sulfide thin film phosphor fine grained. The use of the fine grained zinc sulfide phosphor may be combined with a structure and/or substance to minimize or prevent reaction of the fine grained phosphor with oxygen within a thick film electroluminescent display.

In aspects, a structure or substance suitable for use with the fine grained phosphor may be selected from: interface modifying layers on one or both sides of the phosphor film to improve the stability of the interface between the phosphor film and the rest of the device structure; a hermetic enclosure for the electroluminescent display; an oxygen getter incorporated into the display; and any combination thereof including having all of the structures and substances present together in a single display.

Zinc sulfide based phosphor films are susceptible to degradation due to incorporation of oxygen into the film, either by replacement of sulfur by oxygen in the crystal lattice, or by incorporation of oxygen into the grain boundaries. In fact, the reaction rate with oxygen is increased if the grain size is small or if the zinc sulfide crystal lattice contains a high density of crystal defects. The luminance of zinc sulfide based sulfide phosphor materials is adversely affected by oxygen incorporation. The source of the oxygen may be the internal structure of the display device outside of the phosphor film, or it may be the ambient environment. The rate of oxygen incorporation may be accelerated by the presence of water in the structure. The rate of reaction is typically higher if the crystal grain size is smaller, due in part to the ability of oxygen to diffuse within the film along grain boundaries much more quickly than it can diffuse through the crystal lattice of the individual grains.

To overcome such difficulties, the Applicant's have developed thin film zinc sulfide phosphors doped with rare earth activator species where the phosphor material is fine grained with a preferred morphology and with a preferred crystal structure to improve luminance. The use of such fine grained phosphors may be combined with a structure and/or substance to minimize or prevent reaction of the fine grained phosphor with oxygen.

In one aspect, interface modifying layers may be employed to help limit the rate at which oxygen can react with the phosphor material and facilitates the use of a fine grained phosphor. The interface modifying layer is preferably oxygen-free and hydrogen-free, although it may contain oxygen that is sufficiently tightly bonded that it cannot react with the adjacent phosphor material.

In another aspect, a hermetic enclosure may be provided to minimize exposure of the fine grained phosphor material to oxygen. Such an enclosure may comprise an optically transparent cover plate disposed over the laminated structure comprising the phosphor layer deposited onto the device substrate with a sealing bead between the substrate and the cover plate beyond the perimeter of the laminated structure. The sealing bead may comprise a glass frit or polymeric material as is known to those of skill in the art. Alternatively it may be an oxygen-impermeable sealing layer deposited over, and extending everywhere beyond the perimeter of the laminated structure to prevent exposure of the phosphor to oxygen.

In a further aspect, an oxygen getter may be introduced into the display to remove traces of oxygen. Getter materials are known to those of skill in the art. A getter should be selected that has a greater affinity for oxygen than the phosphor material during the operational lifetime of the electroluminescent device. The getter should be positioned within the hermetic enclosure to capture any residual oxygen within the enclosure or that may permeate into the enclosure during the display life. It is preferable that the getter be positioned so that it is not directly incorporated into or in contact with the fine grained phosphor material.

According to an aspect of the present invention is an improved phosphor for an electroluminescent display, said phosphor comprising;

a thin fine grained rare earth metal activated zinc sulfide phosphor material.

According to another aspect of the present invention is an improved phosphor for an electroluminescent display, said phosphor comprising;

a thin fine grained rare earth metal activated zinc sulfide phosphor material, wherein said phosphor has a crystal grain dimension of up to about 50 nm.

According to another aspect of the present invention is an improved phosphor for an electroluminescent display, said phosphor comprising;

a thin fine grained rare earth metal activated zinc sulfide phosphor material used in combination with a structure or substance to minimize or prevent reaction of said fine grained phosphor with oxygen.

According to still another aspect of the present invention is a thick film dielectric electroluminescent device comprising;
- a thin film fine grained rare earth metal activated zinc sulfide phosphor; and
- a structure and/or substance to minimize or prevent reaction of the fine grained phosphor with oxygen, wherein said structure or substance comprises one or more of;
  i) interface modifying layers on one or both sides of the phosphor film to improve the stability of the interface between the phosphor film and the rest of the device;
  ii) a hermetic enclosure for the electroluminescent device; and
  iii) an oxygen getter incorporated into the device.

According to yet another aspect of the invention is a thick film dielectric electroluminescent device comprising;
- a thin phosphor layer of formula ZnS:Re, wherein said phosphor layer has a crystal grain size of up to about 50 nm and Re is selected from terbium and europium; and
- a structure and/or substance to minimize or prevent reaction of the fine grained phosphor with oxygen, wherein said structure or substance comprises one or more of;
  i) interface modifying layers on one or both sides of the phosphor film to improve the stability of the interface between the phosphor film and the rest of the device;
  ii) a hermetic enclosure for the electroluminescent device; and
  iii) an oxygen getter incorporated into the device.

According to yet another aspect of the present invention is an improved phosphor structure for an electroluminescent display, said structure comprising;
- a thin fine-grained rare earth metal activated zinc sulfide phosphor layer; and
- an interface modifying layer adjacent one or both sides of said phosphor layer.

According to an aspect of the present invention is an improved phosphor structure for an electroluminescent display, said structure comprising;
- a thin phosphor layer of formula ZnS:Re, wherein said phosphor layer has a crystal grain size of up to about 50 nm and Re is selected from terbium and europium; and
- an interface modifying layer adjacent one or both sides of said phosphor layer wherein said modifying layer is selected from the group consisting of pure zinc sulfide, hydroxyl ion free alumina ($Al_2O_3$) or alumina containing hydroxyl ions at a concentration sufficiently low that it does not contribute to phosphor degradation, aluminum nitride, silicon nitride containing no oxygen ($Si_3N_4$) and silicon nitride with a sufficiently low oxygen content that the oxygen is sufficiently tightly bound so as not to contribute to phosphor degradation.

According to an aspect of the present invention is an improved phosphor structure for an electroluminescent display, said structure comprising;
- a thin phosphor layer of formula ZnS:Re, wherein said phosphor layer has a sphalerite crystal structure of grain size of about 20 to about 50 nm and Re is selected from terbium and europium; and
- an interface modifying layer adjacent one or both sides of said phosphor layer wherein said modifying layer is selected from the group consisting of pure zinc sulfide, hydroxyl ion free alumina ($Al_2O_3$) or alumina containing hydroxyl ions at a concentration sufficiently low that it does not contribute to phosphor degradation, aluminum nitride, silicon nitride containing no oxygen ($Si_3N_4$) and silicon nitride with a sufficiently low oxygen content that the oxygen is sufficiently tightly bound so as not to contribute to phosphor degradation.

According to yet another aspect of the present invention is an improved phosphor structure for an electroluminescent display, said structure comprising;
- a thin phosphor layer of formula ZnS:Tb, wherein said phosphor layer has a crystal grain size of about 20 nm to about 50 nm; and
- an interface modifying layer adjacent one or both sides of said phosphor layer wherein said modifying layer is pure zinc sulfide.

According to another aspect of the present invention is a thick film dielectric electroluminescent device comprising;
- a thin fine-grained rare earth metal activated zinc sulfide phosphor layer; and
- an interface modifying layer adjacent one or both sides of said phosphor layer.

According to yet another aspect of the present invention is a method for making a fine grained rare earth metal activated zinc sulfide phosphor film, said method comprising;
- depositing said film onto a substrate using a sputtering process in an atmosphere comprising argon at a working pressure in the range of about 0.5 to $5\times10^{-2}$ torr and an oxygen partial pressure of less than about 0.05 of the working pressure, said film substrate maintained at a temperature between ambient temperature and about 300° C., at a deposition rate in the range of about 5 to 100 Angstroms per second, wherein the atomic ratio of the rare earth metal to zinc in the source material is in the range of about 0.5 to 2 percent.

In aspects of the method, the oxygen partial pressure is preferably less than about 0.02 percent of the working pressure; the film substrate is maintained at a temperature of about between ambient and 200° C.; the working pressure is in the range of about 1 to $3\times10^{-2}$ torr, the deposition rate is in the range of about 5 to 100 Angstroms per second, more preferably in the range of about 5 to 50 Angstroms per second and more preferably in the range of about 10 to 30 Angstroms per second; and the atomic ratio of the rare earth element to zinc in the source material is in the range of about 0.5 to 2 percent.

According to still a further aspect of the present invention is a method for stabilizing a fine grained rare earth metal activated zinc sulfide phosphor, said method comprising;
providing an interface modifying layer adjacent one or both sides of said phosphor.

According to yet another aspect of the invention is a method for stabilizing a fine grained rare earth metal activated zinc sulfide phosphor within a thick film dielectric electroluminescent device, said method comprising;
providing a structure and/or substance to minimize or prevent reaction of the fine grained phosphor with oxygen, wherein said structure or substance comprises one or more of;
  i) interface modifying layers on one or both sides of the phosphor film to improve the stability of the interface between the phosphor film and the rest of the device;
  ii) a hermetic enclosure for the electroluminescent device; and
  iii) an oxygen getter incorporated into the device.

Other features and advantages of the present invention will become apparent from the following detailed description. It should be understood, however, that the detailed description and the specific examples while indicating embodiments of the invention are given by way of illustration only, since various changes and modifications within the spirit and scope of the invention will become apparent to those skilled in the art from said detailed description.

BRIEF DESCRIPTION OF THE DRAWINGS

The present invention will become more fully understood from the detailed description given herein and from the accompanying drawings, which are given by way of illustration only and do not limit the intended scope of the invention.

DETAILED DESCRIPTION OF THE INVENTION

The present invention is a fine-grained zinc sulfide thin film phosphor layer in a thick film electroluminescent device where additionally a structure and/or substance is provided to minimize or prevent reaction of the fine grained phosphor with oxygen. The structure or substance may be selected from one or more of: interface modifying layers on one or both sides of the phosphor film to improve the stability of the interface between the phosphor film and the rest of the device; a hermetic enclosure for the electroluminescent device; and an oxygen getter incorporated into the device. It is understood by one of skill in the art that the fine grained zinc sulfide phosphor of the invention may be incorporated into an electroluminescent device additionally having one or all of the aforementioned structures or devices.

In one preferred aspect, the fine grained thin film zinc sulfide phosphor film is in contact at one or both surfaces with an interface modifying layer that improves the electrical and chemical stability of the phosphor film and its interface with the rest of the electroluminescent device. The novel combination of fine grained phosphor with a preferred morphology and with a preferred crystal structure with one or more layers of an interface modifying layer adjacent the phosphor, acts to stabilize the phosphor from degradation and provide enhanced luminance and longer operational life of the phosphor within an electroluminescent device.

The present invention is particularly applicable to electroluminescent devices employing a thick dielectric layer having a high dielectric constant dielectric layer wherein the thick dielectric material is a composite material comprising two or more oxide compounds that may evolve chemical species that are deleterious to phosphor performance in response to thermal processing or device operation and wherein the surface of the thick dielectric is rough on the scale of the phosphor thickness resulting in cracks or pinholes through the device structure and contains voids that may contain or absorb such species, thus contributing to a loss of luminance and operating efficiency over the operating life of the device.

Figure 1:
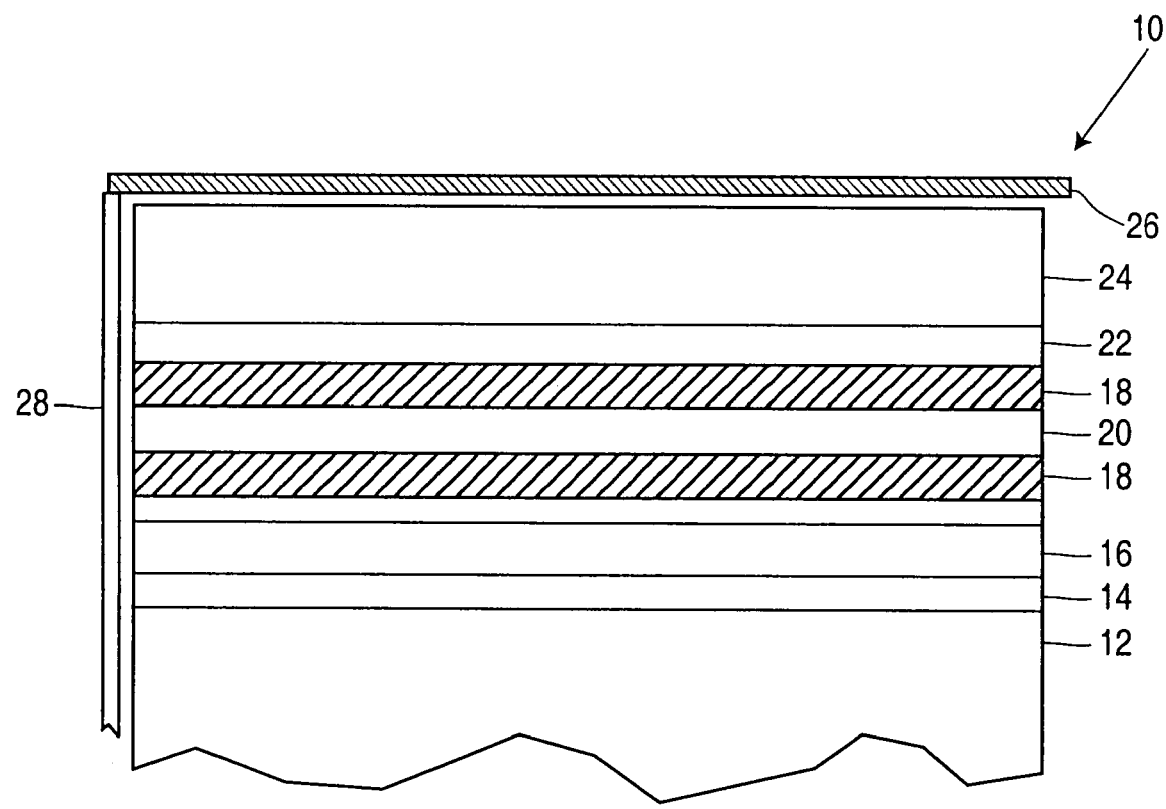
FIG. 1 shows a schematic drawing of the cross section of a thick dielectric electroluminescent device showing the position of silicon nitride layers of the present invention.

FIG. 1 shows a schematic drawing of the cross section of an electroluminescent device of the present invention generally indicated by reference numeral 10. The device 10 has a substrate 12 with a metal conductor layer 14 (ie. gold), a thick film dielectric layer 16 (i.e. PMT-PT) and a smoothing layer 18 (i.e. lead zirconate titanate) thereon. A variety of substrates may be used, as will be understood by persons skilled in the art. The preferred substrate is a substrate that is opaque in the visible and infrared regions of the electromagnetic spectrum. In particular, the substrate is a thick film dielectric layer on a ceramic substrate. Examples of such substrates include alumina, and metal ceramic composites. An interface modifying layer 18 is shown to be present adjacent the phosphor layer 20. While the interface modifying layer 18 is shown on both sides of the phosphor, it is understood that only one such layer either above or below the phosphor may be used. A thin film dielectric layer 22 and then an ITO transport electrode 24 are present above the phosphor. A hermetic enclosure 26 is shown disposed over the laminated structure which is enclosed by a sealing bead 28.

The interface modifying layer helps to minimize migration of oxygen into the phosphor material during device operation to avoid performance degradation. The interface modifying layer, in addition to inhibiting the migration of oxygen, helps to minimize migration of water or other deleterious chemical species originating from the external environment into the phosphor to cause a reduction in luminance. Similarly, a hermetic enclosure and oxygen getter both act to minimize exposure of the phosphor material to oxygen.

The present invention is particularly directed towards improving the luminosity and operating life of rare earth-activated zinc sulfide phosphor materials, or zinc sulfide phosphors doped with another activator whose radiative efficiency can be improved by reducing the grain size of the host crystal lattice. While not being bound to any particular theory, the increase in phosphor stability and luminance may be related to an increase in the radiative transition probability for the activator species in question due to a change in its local environment within the host lattice, for example by a slight shift in the atomic levels localized on the activator atom relative to the electronic band gap of the zinc sulfide host lattice. If the energy difference between one or other of these electronic energy levels and the electron states in the top of the valence band or bottom of the conduction band is reduced by sufficiently reducing the grain size such that the electronic band structure deviates to a degree from that for bulk zinc sulfide, then spectroscopic selection rules that would normally prevent or nearly prevent the optical transition in question may be partially removed, thus increasing the radiative transition probability. This may in turn decrease a tendency for non-radiative relaxation of the activator species (such that light would not be emitted during the relaxation process). This model is supported by the experimental observation that the radiative decay time for photoexcitation of terbium as an activator species is substantially reduced if the host grain size is reduced to about 50 nm. Some activator species such as manganese in zinc sulfide are relatively unaffected by a decrease in the crystal grain size of the host material, and this may have to do with the positioning of the manganese electron states with respect to the zinc sulfide band gap. Also activator species typified by manganese may be relatively unaffected by the substitution of oxygen of sulfur in the immediate environment of the host lattice. The pronounced reduction in the luminance of terbium activated zinc sulfide with the substitution of oxygen for sulfur in the host lattice is possibly due to the high affinity of terbium for oxygen. Sulfur can be displaced by oxygen in the zinc sulfide host material. Such reactions are expected to be enhanced if the grain size is small.

The zinc sulfide phosphors for the invention can be represented by the formula ZnS:RE where RE is a rare earth metal selected from the group consisting of terbium and europium. Terbium is most preferred for use in the invention. The atomic ratio of terbium or europium to zinc is preferably in the range of about 0.005 to about 0.02 and more preferably in the range of about 0.01 to 0.02.

The zinc sulfide phosphors of the invention are fine grained rare earth-activated zinc sulfide phosphor films wherein the crystal structure of the zinc sulfide comprises the zincblende (sphalerite) crystal structure with the (111) crystallographic direction substantially aligned in a direction perpendicular to the plane of the film and wherein an interface modifying film is provided in contact with one or both surfaces of the film. The fine grained phosphor is preferably deposited using a sputtering process in an atmosphere comprising argon or another inert gas and optionally containing a minor concentration of hydrogen sulfide or another sulfur bearing vapour to minimize oxygen incorporation into the phosphor film.

The crystal grains of the zinc sulfide phosphor are columnar in shape with the long dimension of the columns extending substantially across the thickness of the phosphor film in a direction perpendicular to the film and where the width of the columnar grains is less than about 50 nm, and wherein the phosphor film is in contact at one or both of its surfaces with an interface modifying layer for the purpose of minimizing performance degradation of the phosphor material during device operation. The grain size is defined as the dimension in a direction perpendicular to the column axis when the grains have a columnar shape. It is understood by those of skill in the art that the crystal grain dimension can be of any size up to about 50 nm and any ranges thereof, such as from but not limited to about 20 nm to about 50 nm, about 30 nm to about 50 nm and about 40 nm to about 50 nm. The thickness of the zinc phosphor layer is about 0.5 to about 1.0 µm.

The phosphor of the present invention may be deposited onto a suitable substrate by a variety of known methods such as for example, sputtering, electron beam deposition and chemical vapour deposition. Sputtering is the preferred method to deposit the fine grained phosphor. Sputtering is conducted in an atmosphere comprising argon at a working pressure in the range of about 0.5 to $5 \times 10^{-2}$ torr and an oxygen partial pressure of less than about 0.05 percent of the working pressure. The film substrate is maintained at a temperature between ambient temperature and about 300° C. at a deposition rate in the range of about 5 to 100 Angstroms per second. The atomic ratio of the rare earth metal to zinc in the source material is about 0.5 to about 2 percent to provide the desired ratio in the deposited film in the range of about 0.005 to 0.02 and preferably in the range of about 0.01 to 0.02.

It is understood by one of skill in the art that in aspects of the method, the oxygen partial pressure is preferably less than about 0.02 percent of the working pressure; the working pressure is in the range of about 1 to $3 \times 10^{-2}$ torr, the film substrate is maintained at a temperature of about between ambient and 200® C.; the deposition rate is in the range of about 15 to 50 Angstroms per second, more preferably 20 to 30 Angstroms per second; and the atomic ratio of the rare earth element to zinc in the source material in the range of about 0.8 to 1.2 percent such to provide a deposited film with an atomic ratio of rare earth element to zinc in the range of 0.005 to 0.02.

The provision of a fine grained and defined crystal structure for the zinc sulfide phosphor is dependent on a variety of conditions of the deposition process such as for example: substrate nature, substrate temperature, deposition rate, type and concentration of dopant, pressure and composition of vacuum environment. In one aspect of the invention the rate at which oxygen can diffuse within the phosphor layer is limited by minimizing the concentration of sulfur vacancies in the zinc sulfide phosphor material and minimizing the oxygen concentration in the phosphor layer after fabrication of the electroluminescent device. A means to limit the oxygen and sulfur vacancy concentration is to deposit the phosphor layer in a low-pressure sulfur-containing atmosphere but at a pressure sufficient to ensure that the deposited phosphor material is not sulfur-deficient. Conditions to ensure sulfur sufficiency are well known in the art. Further, one of skill in the art could readily examine the deposited phosphor film and confirm by methods such as x-ray diffraction analysis that the film was in fact fine grained in accordance with the present invention.

The effect of oxygen in decreasing the luminance of terbium activated zinc sulfide thin phosphor films has been demonstrated by comparing the performance of films sputtered in an argon atmosphere to that of films sputtered in an atmosphere comprising 0.1% oxygen in argon. The luminance of the latter films in thick dielectric electroluminescent devices was shown to be substantially, lower than that of the former films.

The interface modifying layer(s) of the invention can comprise a variety of materials such as for example pure zinc sulfide, hydroxyl ion free alumina, aluminum nitride, silicon nitride and aluminum oxide that has been deposited using atomic layer epitaxy wherein the hydroxyl ions contained within the oxide layer is maintained at a concentration sufficiently low that it does not contribute to phosphor degradation. Preferred materials for use as an interface modifying layer are pure undoped zinc sulfide and silicon nitride.

The thickness of the modifying layer or layers is chosen to be sufficient to prevent oxygen incorporation into the phosphor film but not too thick that the voltage drop across the modifying and phosphor contributes excessively to an increased operation voltage for the display. If the modifying layer is too thin, it may not be continuous and therefore may not prevent oxygen incorporation into the phosphor layer. Further, diffusion of oxygen through the film along grain boundaries is faster if the film is thinner. Generally, if the relative dielectric constant of the modifying layer is in the range of about 7 to 10, a thickness in the range of about 40 to 60 nm is suitable. One skilled in the art may readily optimize the thickness by achieving a practical trade-off between the inhibiting reaction of oxygen with the phosphor and minimizing the operating voltage for the device.

In one aspect of the invention, sputtering is the preferred method for deposition of a silicon nitride interface modifying layer phosphor. The deposition rate is controlled by adjusting the rf power to the target. The deposition rate being adjusted to provide a dense non-porous coating to provide an effective oxygen barrier at the desired thickness. Typically a deposition rate in the range of about 4 to 6 Angstroms per second is suitable. The temperature of the substrate during deposition is maintained close to ambient temperature up to about 200° C.

In the case of silicon nitride (that does not contain oxygen), the film composition of the silicon nitride should be controlled in order that it adhere well to the phosphor layer. Specifically, the film should not contain nitrogen beyond the stoichiometric ratio for $Si_3N_4$. Excess nitrogen has been found to cause internal stress to accumulate within the film leading to delamination. It has been found that if the reactive sputtering is carried out using a silicon nitride target in a low pressure nitrogen atmosphere, the composition of the film can be controlled so that the film comprises a composite film comprising stoichiometric silicon nitride and elemental silicon. Provided that the silicon content is maintained at a suitably low level, the electrical resistivity of the silicon nitride film will be maintained at a suitably high value, the chemical reactivity will be suitably low and the internal stress in the film will be sufficiently low to prevent delamination of the silicon nitride film from the phosphor and other adjacent layers.

The required composition for a sputtered silicon nitride film can be achieved provided that the ratio of argon to nitrogen is within the range of about 6:1 to 2:1 and the working pressure is maintained within the range of about $8 \times 10^{-4}$ torr to about $6 \times 10^{-3}$ torr. If the ratio of argon to nitrogen is too low, the deposited film will have high internal stress and may delaminate from adjacent layers. If the ratio is too high the deposited film may be chemically reactive and have an unacceptably high electrical conductivity. These undesirable properties will arise if the silicon phase is in sufficient concentration to form a continuous silicon network through the composite film and is not encapsulated by the silicon nitride phase to prevent chemical reaction of the silicon with oxygen or other reactive species in the immediate environment.

The nitrogen content must be optimized within a preferred range by appropriate control over the deposition and subsequent thermal treatment of the silicon nitride film in a manner that is compatible, with the rest of the display structure upon which it is deposited. Typically it is found that vacuum deposition from a silicon nitride target provides satisfactory results provides that the deposition atmosphere comprises an inert atmosphere with a sufficient concentration nitrogen present to avoid silicon precipitation, but not so high as to allow excessive nitrogen to be incorporated into the film. Sputtering has been found to be particularly effective as a deposition means.

Hermetic enclosures may comprise an optically transparent cover plate disposed over the laminated structure comprising the fine grained phosphor layer deposited onto a substrate. A sealing bead is provided between the substrate and cover plate beyond the perimeter of the laminated structure. The sealing bead may comprise a glass frit or polymeric material. Alternatively, a hermetic enclosure may be an oxygen-impermeable sealing layer extending over and beyond the perimeter of the laminated structure to prevent the phosphor to oxygen exposure. Suitable oxygen-impermeable materials are known to those of skill in the art and may include but are not limited to glass and glass frit compositions.

Getter materials, in particular, oxygen getters may be used to remove traces of oxygen in the electroluminescent display. Suitable getter materials for use in the invention are known to those of skill in the art and include but are not limited to titanium and barium. It is preferred that the getter material not be directly incorporated or in contact with the phosphor layer.

The present invention is suited for use in an electroluminescent display or device as described for example in Applicant's WO 00/70917 (the disclosure of which is incorporated herein by reference). Such an electroluminescent device has a substrate on which is located row electrodes. A thick film dielectric is provided with a thin film dielectric thereon. Thin film dielectric is provided as pixel columns. The pixel columns cortain phosphors to provide the three basic colors viz. red, green and blue. In an alternate embodiment, a common thin film dielectric may be deposited over all of the pixels at one time rather than separately deposited dielectric layers over each pixel.

A variety of substrates may be used, as will be understood by persons skilled in the art. In particular, the substrate is a rigid refractory sheet that in one aspect has deposited thereon an electrically conductive film with a thick dielectric layer deposited on the conductive film. Examples of suitable refractory sheet materials include but are not limited to ceramics such as alumina, metal ceramic composites, glass ceramic materials and high temperature glass materials. Suitable electrically conductive films are known to those of skill in the art such as, but not limited to, gold and silver alloy. The thick dielectric layer comprises ferroelectric material. The thick dielectric layer may also comprise one or more thin film dielectric layers thereon.

The above disclosure generally describes the present invention. A more complete understanding can be obtained by reference to the following specific Examples. These Examples are described solely for purposes of illustration and are not intended to limit the scope of the invention. Changes in form and substitution of equivalents are contemplated as circumstances may suggest or render expedient. Although specific terms have been employed herein, such terms are intended in a descriptive sense and not for purposes of limitation.

EXAMPLE 1

Three thick dielectric electroluminescent devices incorporating thin film phosphor layers comprising fine-grained zinc sulfide activated with terbium were constructed. The thick film substrate was comprised of a 5 cm by 5 cm alumina substrate having a thickness of 0.1 cm. A gold electrode was deposited on the substrate, followed with a thick film high dielectric constant dielectric layer in accordance with the methods exemplified in Applicant's co-pending international application PCT CA00/00561 filed May 12, 2000 (the entirety of which is incorporated herein by reference). A thin film dielectric layer consisting of barium titanate, with a thickness of about 100-200 nm, was deposited on top of the thick film dielectric layer using the sol gel technique described in Applicant's co-pending U.S. patent application Ser. No. 09/761,971 filed Jan. 17, 2001 (the entirety of which is incorporated herein by reference).

A zinc sulfide phosphor film activated with about 2 atomic percent terbium added to the source material as a mixture of terbium fluoride and terbium oxide as $Tb_4O_7$ was electron-beam evaporated on top of the barium titanate layer. The deposition was carried out in a chamber initially evacuated to a pressure of $5 \times 10^{-6}$ torr and into which hydrogen sulfide was injected at 0 to 35 sccm to maintain a hydrogen sulfide pressure of 1 to $10 \times 10^{-5}$ torr during the deposition. The substrate was at a temperature in the range of 100° C. to 200° C. during the deposition. The growth rate of the film was 20 to 50 Angstroms per second and the film thickness was in the range of 0.9 to 1.1 micrometers.

Next a 50 nm thick alumina layer and an indium tin oxide upper conductor film were deposited on the phosphor layer according to the methods of Applicant's co-pending international application PCT CA00/00561 (the entirety of which is incorporated herein by reference) and wherein one completed device was annealed in air at 550° C., one was annealed under nitrogen at 550° C., and the third was not annealed following deposition of the indium tin oxide and prior to testing.

Figure 2:
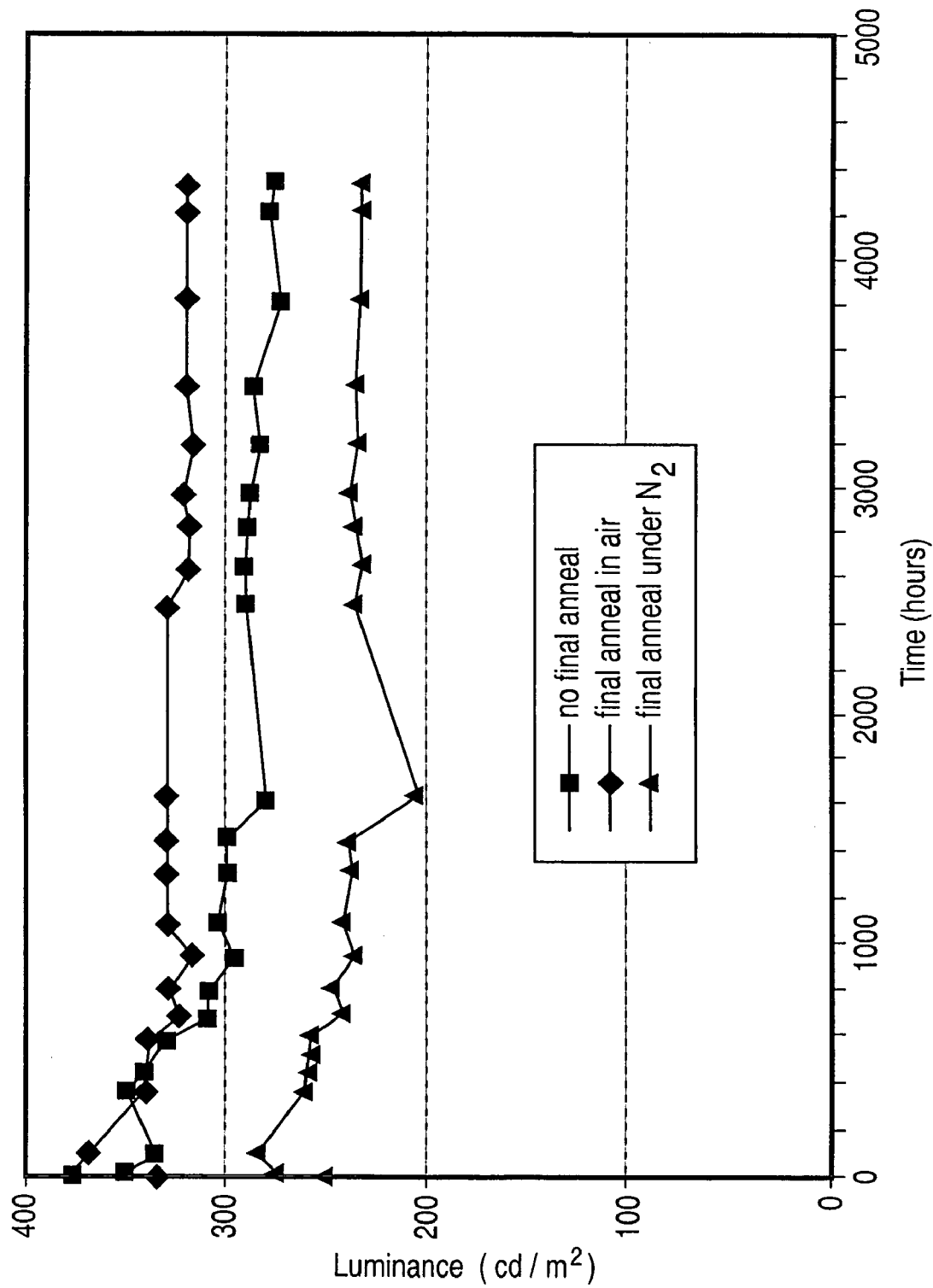
FIG. 2 are graphs showing the luminance versus cumulative operating time for electroluminescent devices having an electron beam-deposited terbium activated zinc sulfide phosphor subject to different annealing conditions.

The electroluminescence of the completed devices was measured by applying a 240 Hz alternating polarity square wave voltage waveform of amplitude 60 volts about the optical threshold voltage for the device. The luminance data is shown in FIG. 2. The measured luminance can be seen from the figure to be in the range of about 300 to 400 candelas per square meter, slowly decreasing to about 250 to 350 candelas per square meter after about 5000 hours testing.

Figure 3:
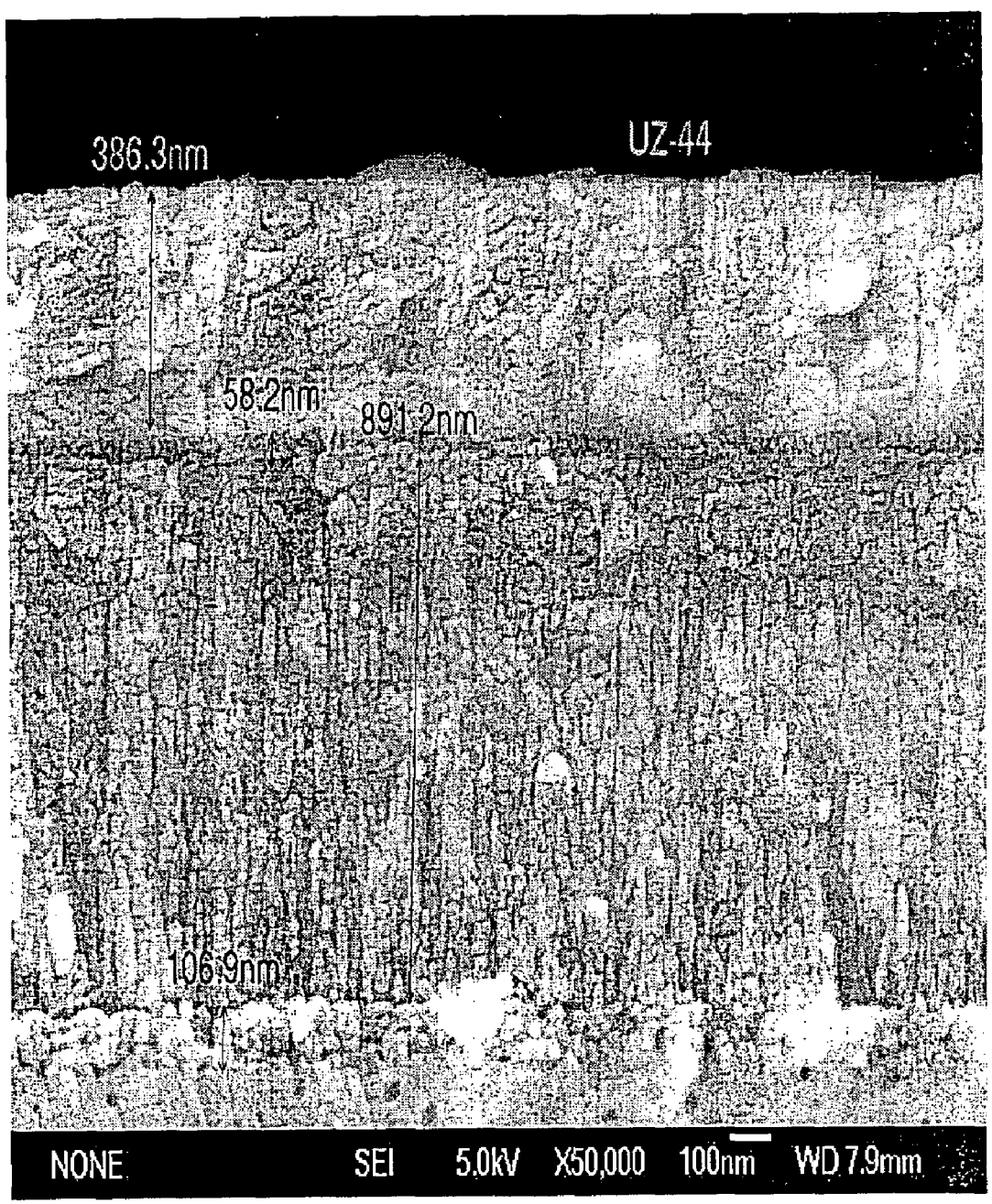
FIG. 3 is a scanning electron micrograph of a cross section of an electron beam evaporated terbium activated zinc sulfide phosphor film in an electroluminescent device.

A scanning electron micrograph was obtained of a cross section of the deposited phosphor film, as shown in FIG. 3. The majority of the crystal grains can be seen to be in the size range of 50 to 150 nm with an aspect ratio (length to width ratio) in the range of about 1:1 to 5:1. Also visible in the micrograph are the alumina layer and indium tin oxide layer above the phosphor film and a portion of the underlying dielectric layer upon which the phosphor was deposited. Chemical analysis of the film by energy dispersive x-ray analysis (EDX) showed that it was essentially stoichiometric with an atomic ratio of sulfur to zinc close to 1.

EXAMPLE 2

Two electroluminescent devices were constructed similar to that of example 1, but with a fine-grained terbium activated zinc sulfide phosphor film deposited using an rf sputtering process rather than electron beam evaporation. The film was sputtered in a chamber initially evacuated to a base pressure of $8 \times 10^{-7}$ torr and then filled with argon controlled to a pressure of $2.5 \times 10^{-2}$ torr during the sputtering process. The sputtering target was a rectangular solid of dimensions 38 cm long by 12 cm wide by 0.7 cm thick with a composition similar to that of the electron beam pellet. The film was deposited at a rate of 20 Angstroms per second to a thickness in the range of 650 to 800 nm using an rf power of 2.6 watts per cm$^2$.

Figure 4:
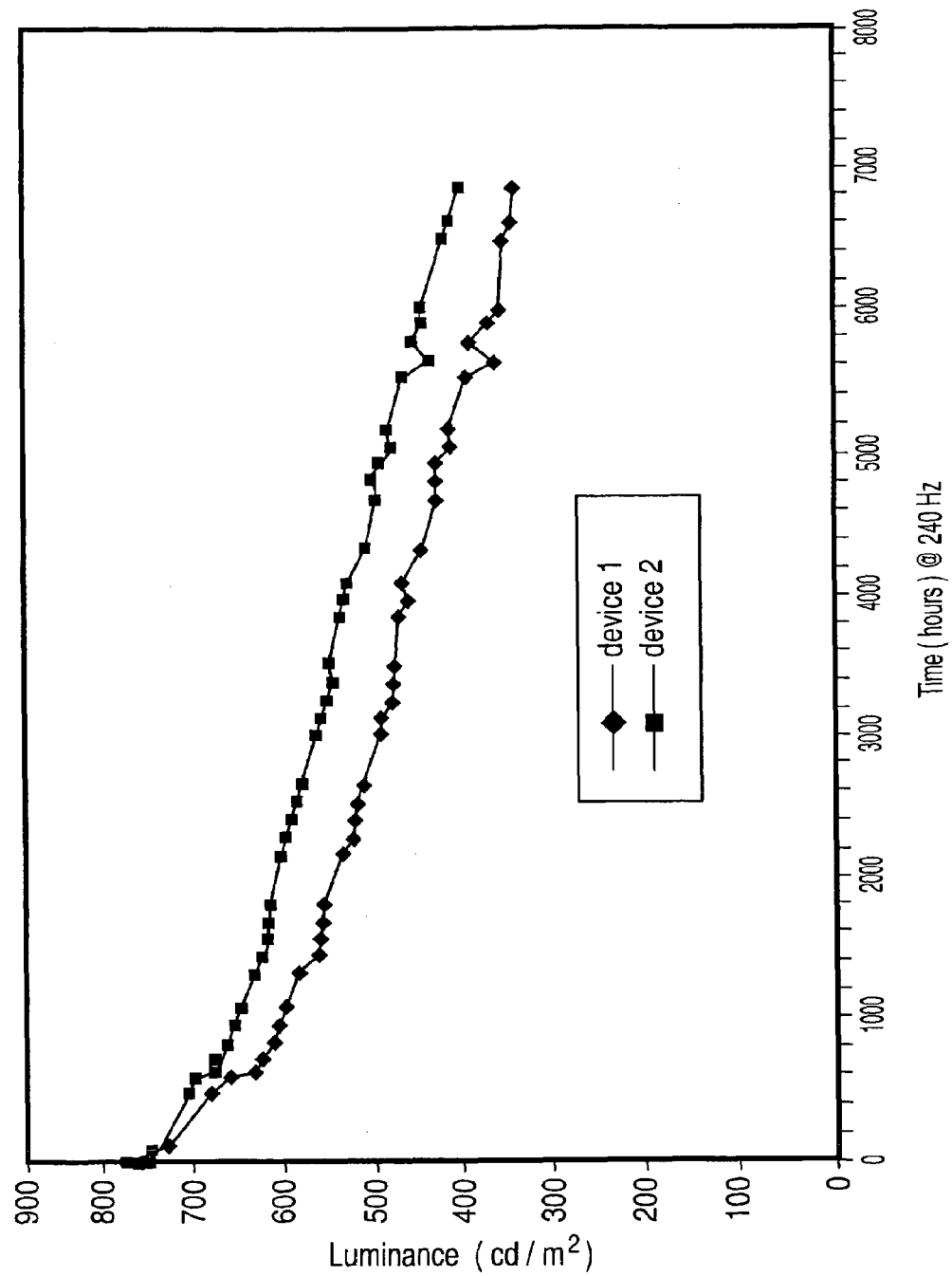
FIG. 4 is a graph showing the luminance versus cumulative operating time for an electroluminescent device having a fine-grained sputtered terbium activated zinc sulfide phosphor

The devices were tested under similar conditions to those of example 1 except that the aging test was carried out at 240 Hz during the first 300 hours and then switched to 1.2 kHz to accelerate the test. The results with the time scale multiplied by 5 beyond 300 hours (the ratio of 1.2 kHz to 240 Hz) and the luminance divided by the same factor beyond 300 hours in FIG. 4. As can be seen from this figure, the initial luminance was about 750 candelas per square meter, but decreased in an approximately linear fashion to about 400 candelas per square meter after the equivalent of about 7000 hours of testing. This example shows that the initial luminance was substantially improved over that for the electron beam deposited phosphor having a larger grain size, but, unlike the phosphors with larger grain size, the luminance decreased significantly with increasing operating time.

Figure 5:
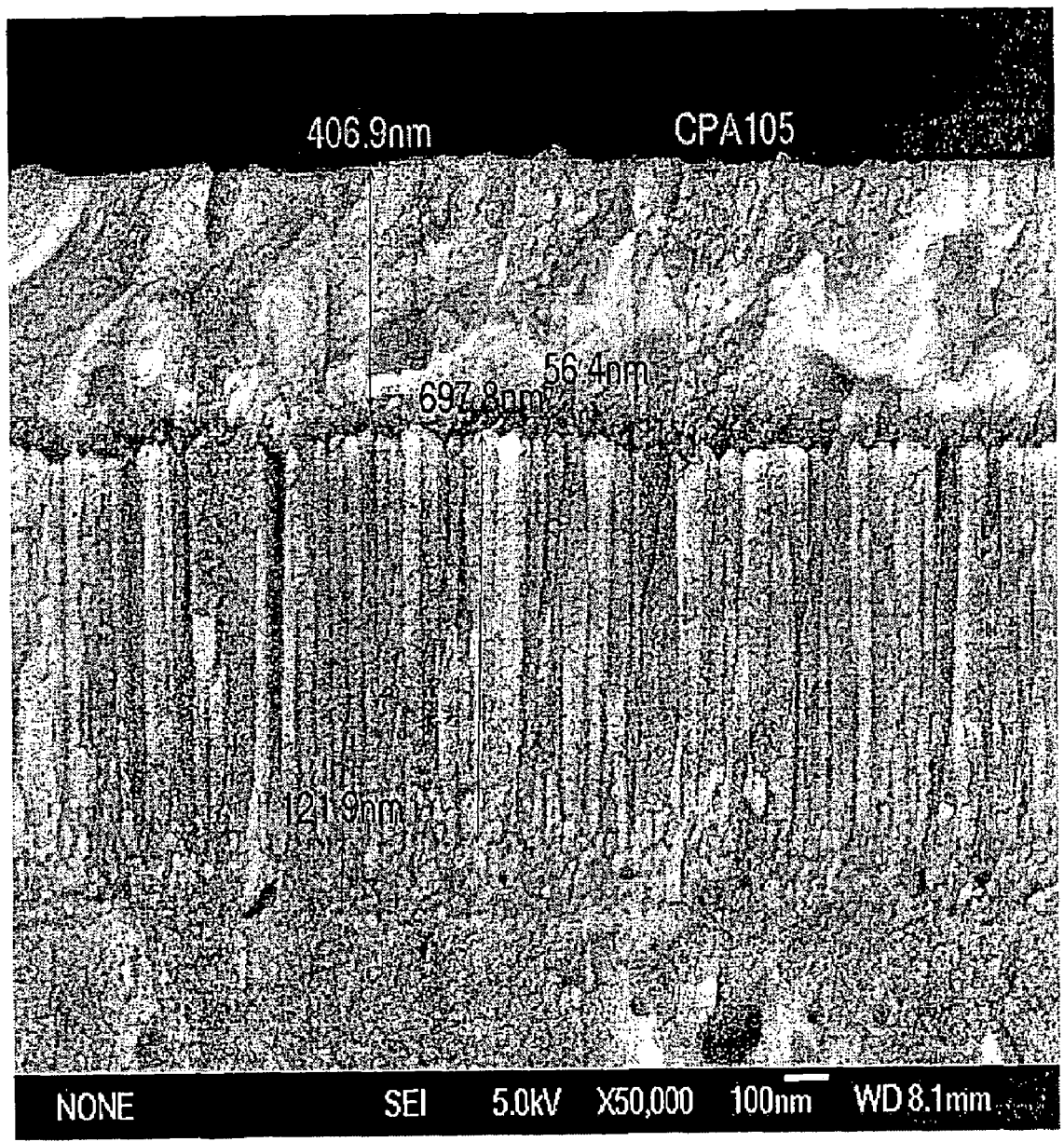
FIG. 5 is a scanning electron micrograph of a cross section of a fine-grained sputtered terbium activated zinc sulfide phosphor film in an electroluminescent device.

A scanning electron micrograph was obtained of a cross section of a similar device. The scanning electron micrograph is shown in FIG. 5. It shows that the crystal grains of the phosphor film are substantially aligned in a direction perpendicular to the plane of the film and extend substantially across the approximate 700 nm thickness of the film. The width of the grains is mostly in the range of 20 to 50 nm. Further, x-ray diffraction analysis of the film showed the grains to consist of the zincblende crystal structure with the (111) crystallographic direction substantially perpendicular to the plane of the film. However, the film was found to be deficient in sulfur, with an atomic ratio of sulfur to zinc determined from EDX measurement of about 0.9 and with a portion of the anion deficiency made up with oxygen.

EXAMPLE 3

Figure 6:
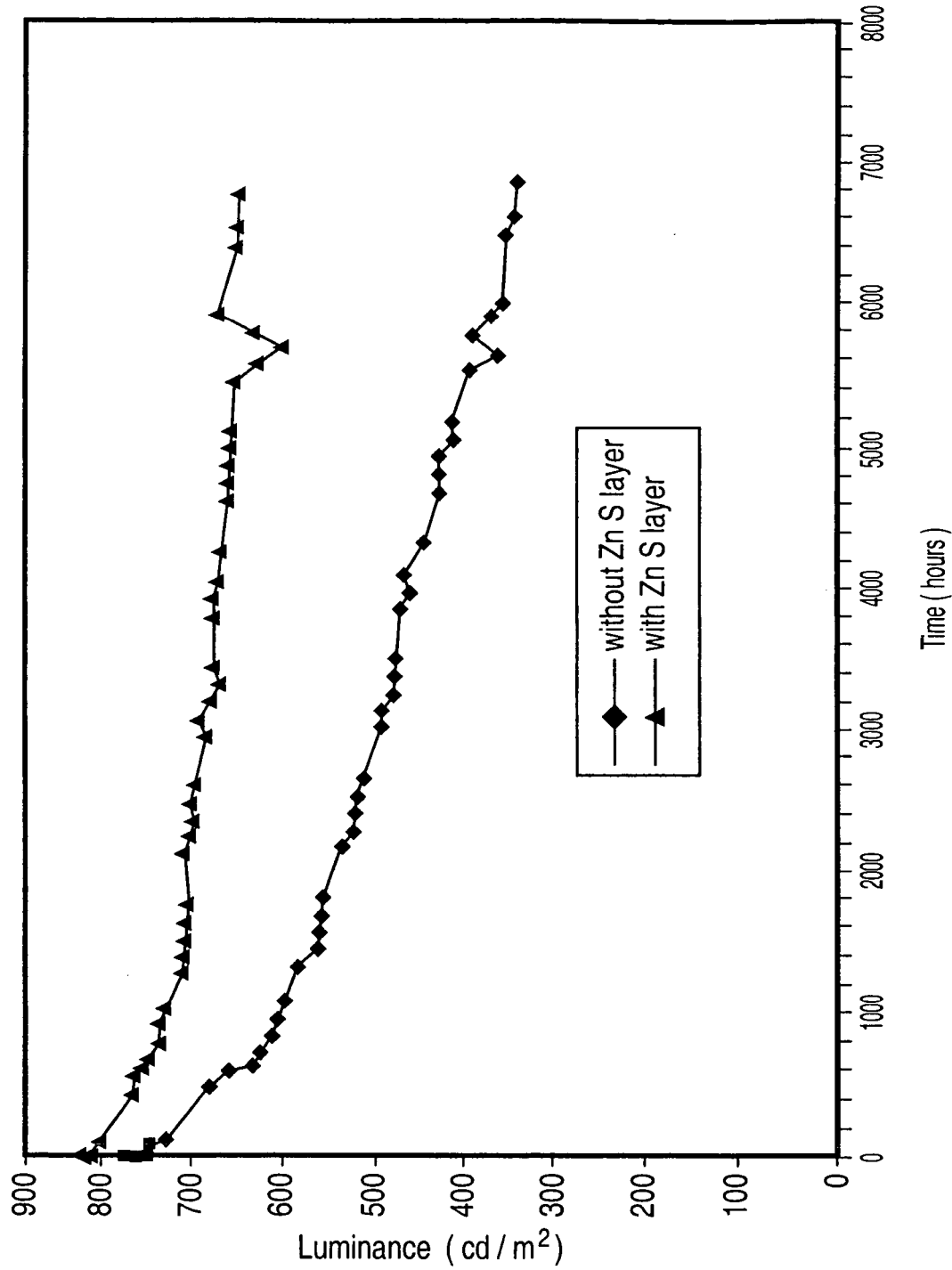
FIG. 6 is a graph comparing the luminance versus cumulative operating time for an electroluminescent device having a fine-grained sputtered terbium activated phosphor film in contact with an undoped zinc sulfide layer against that of a similar device without the undoped zinc sulfide layer.

An electroluminescent device was constructed similar to that of example 2, but with an interface modifying layer comprising a 50 nm thick undoped zinc sulfide layer deposited using electron beam evaporation on top of the phosphor layer. The luminance versus operating time in an accelerated aging test where the voltage pulse frequency was 240 Hz for the first 300 hours and 1.2 KHz thereafter is shown in FIG. 6, against similar data for another device without the undoped zinc sulfide. The luminance was converted to an equivalent luminance at 240 Hz, as in the previous examples. It can be seen from this figure that the initial luminance of the two devices is similar, but the rate of decrease of the luminance of the one with the undoped zinc sulfide layer is significantly lower.

This example shows the benefit of the undoped essentially pure zinc sulfide layer in stabilizing the luminance of the fine-grained terbium activated zinc sulfide phosphor layer.

EXAMPLE 4

Figure 7:
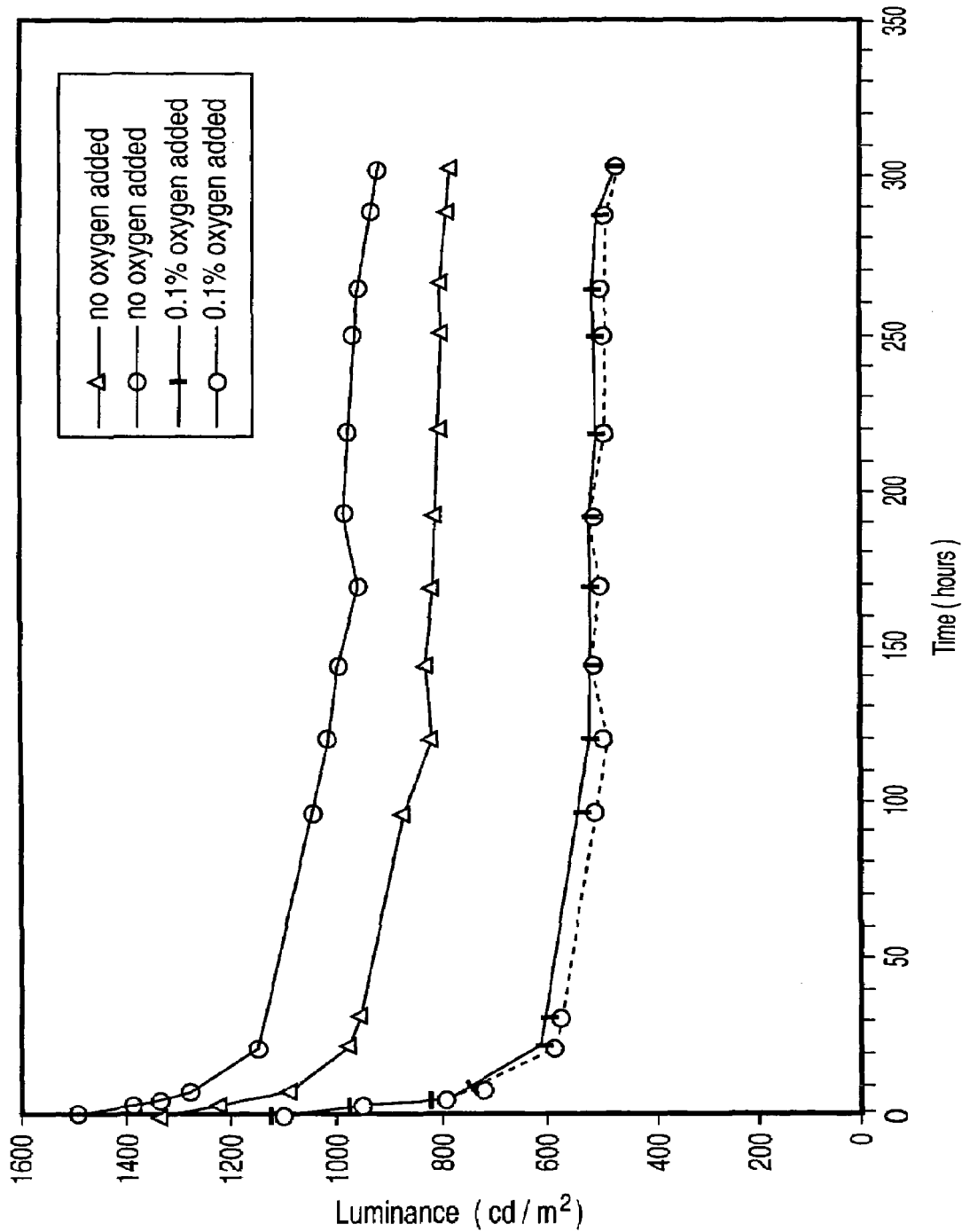
FIG. 7 is a graph comparing the luminance versus cumulative operating time for an electroluminescent device having a fine grained sputtered terbium activated phosphor film doped with oxygen against that of a similar device that was not doped with oxygen.

Four electroluminescent devices similar to those of example 2, two of which had 0.1 percent oxygen added to the: argon used to maintain the atmosphere for phosphor film sputtering were constructed and tested. The comparative luminance data is shown in FIG. 7. As can be seen from this figure, the addition of oxygen resulted in a film with significantly reduced luminance.

EXAMPLE 5

Two electroluminescent devices similar to those of example 2 were constructed, except that a 50 nm thick silicon nitride layer was sputtered onto the phosphor layer of one of the devices prior to deposition of an upper alumina dielectric layer and the indium tin oxide electrode. To deposit the silicon nitride layer a $Si_3N_4$ sputtering target was employed and the sputtering atmosphere was an argon-nitrogen mixture with a ratio of argon to nitrogen of 2.3. The working pressure for sputtering was $2 \times 10^3$ torr. The argon flow rate into the sputtering chamber, during the sputtering operation was about 7 sccm. The deposition rate for the film was 5 Angstroms per second.

Figure 8:
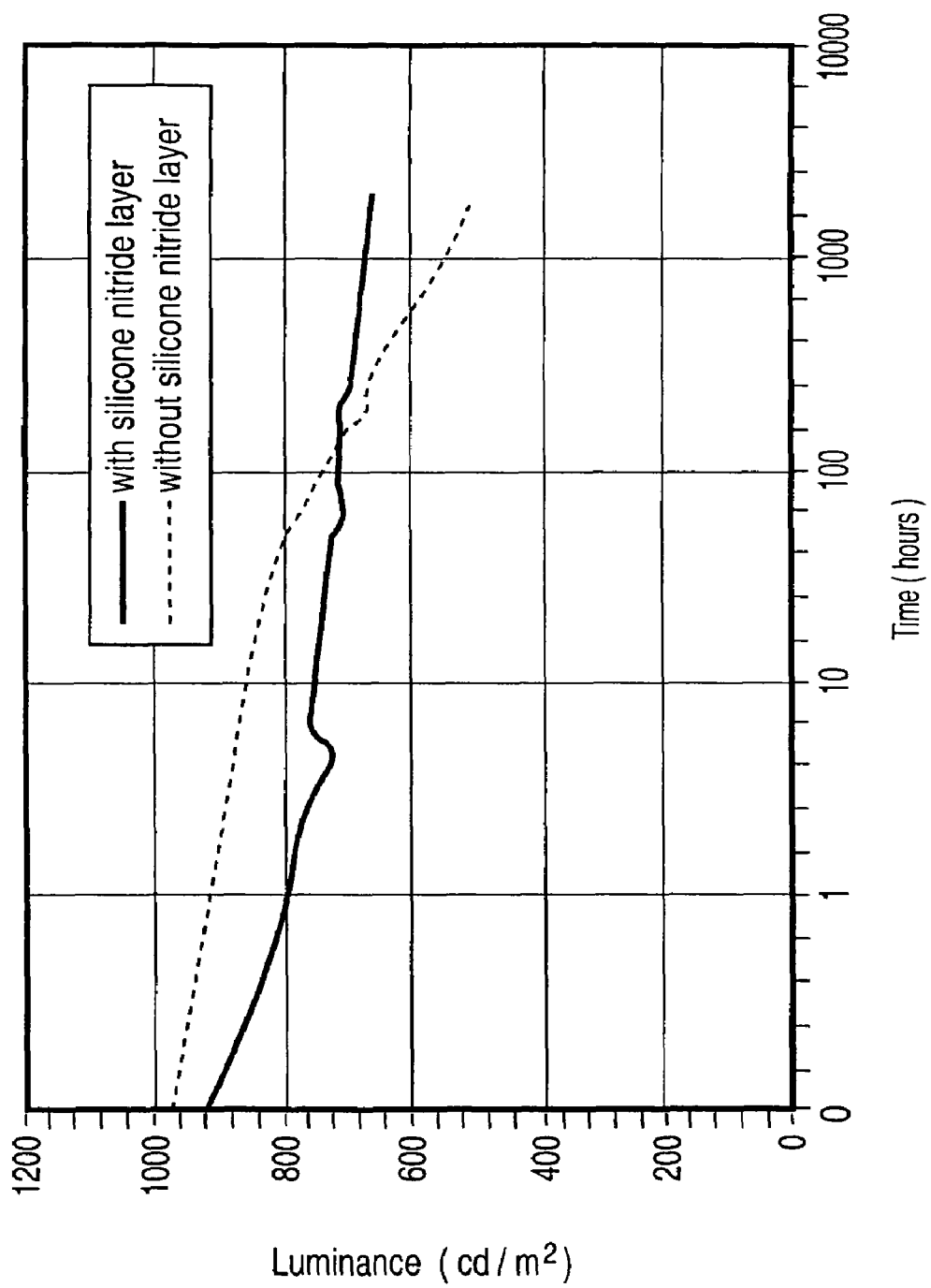
FIG. 8 is a graph comparing the luminance versus cumulative operating time for an electroluminescent device having a fine-grained sputtered terbium activated phosphor film in contact with a silicon nitride layer against that of a similar device without the silicon nitride layer.

The luminance of the devices was measured as a function of operating time in an accelerated test at 1200 Hz with a voltage 60 volts above the initial threshold voltage. The comparative luminance data, converted to luminance at 240 hz, is shown in FIG. 8. As with the insertion of an undoped zinc sulfide on top of the phosphor film, the silicon nitride layer had the effect of stabilizing the luminance of the device as it was operated.

EXAMPLE 6

Two electroluminescent devices similar to those of example 3 were constructed except that a 30 nm thick alumina layer was deposited using atomic layer epitaxy onto the phosphor layer. The atomic layer chemical vapour deposition (ALCVD) was carried out using tetramethyl aluminum and water as precursor reagents with the deposition substrate held at a temperature of 290° C. The use of ALCVD ensured that the deposited alumina layer was conformal to the phosphor surface and had a minimal density of pinholes or other defects that may allow oxygen infusion into the phosphor layer It also minimized the hydroxyl content of the alumina layer.

Figure 9:
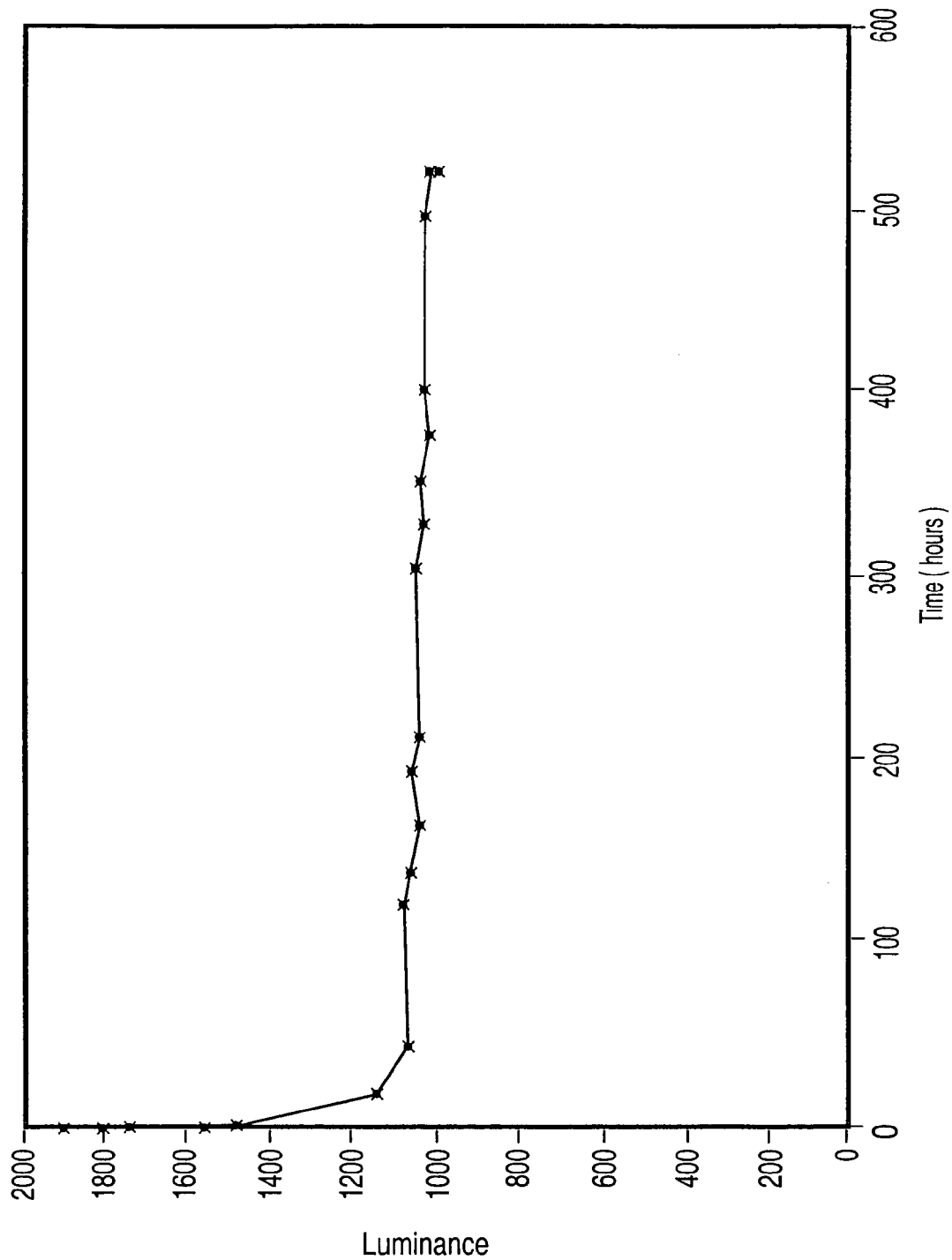
FIG. 9 is a graph comparing the luminance versus cumulative operating time for an electroluminescent device having a fine-grained sputtered terbium activated phosphor film in contact with an alumina layer deposited using atomic layer chemical vapour deposition.

The luminance of the devices was measured as a function of operating time at 240 Hz. The luminance at 60 volts above the threshold voltage stablized at about 1050 candelas per square meter and remained at level for in excess of 500 hours. The luminance data is shown in FIG. 9, again showing the stabilizing effect of the protective layer.

EXAMPLE 7

Four devices were constructed similar to those in example 2, except that the working pressure and flow or the argon component of the working gas were varied as identified in table 1 below. The luminance at 60 volts above the threshold voltage at a frequency of 240 Hz.

TABLE 1

| Device Number | Working Pressure | Argon Flow | Luminance |
| --- | --- | --- | --- |
| 1 | $8 \times 10^{-3}$ torr | 52 sccm | 1315 cd/m$^2$ |
| 2 | $8 \times 10^{-3}$ torr | 160 sccm | 1695 cd/m$^2$ |
| 3 | $15 \times 10^{-3}$ torr | 100 sccm | 2320 cd/m$^2$ |
| 4 | $25 \times 10^{-3}$ torr | 172 sccm | 2215 cd/m$^2$ |

The phosphor grain structure of the four devices was examined by scanning electron microscopy of cross sections of the phosphor film. It was noted device #1 had a grain diameter of approximately 50 nm and did not show columnar grain shapes. Device #2 also had a grain diameter of about 50 nm and a measure of columnar structure. Devices #3 and #4 had clearly columnar grains and grain sizes of approximately 40 nm and 30 nm, respectively. This example demonstrates improved luminance associated with phosphor grain sizes of less than 50 nm achieved as the working pressure is increased above $8 \times 10^{-3}$ torr. It also demonstrates a weaker trend to higher luminance as the working gas flow rate is increased. This latter effect is thought to be due to more efficient purging of oxygen from the process gas at higher flow rates.

Although preferred embodiments of the invention have been described herein in detail, it will be understood by those skilled in the art that variations may be made thereto without departing from the spirit of the invention or the scope of the appended claims.

We claim:

1. An improved phosphor for a thick film electroluminescent display, said phosphor comprising;
  a thin filmrare earth metal activated zinc sulfide phosphor, wherein said phosphor is fine grained and has a crystal grain dimension of up to about 50 nm;
  wherein said rare earth metal activated zinc sulfide phosphor layer has the formula ZnS:RE, wherein RE is selected from the group consisting of terbium and europium and the atomic ratio for terbium or europium to zinc is about 0.005 to 0.02,
  wherein said phosphor comprises crystal grains that are columnar in shape with the long direction of the columns extending substantially across the thickness of the phosphor film in a direction perpendicular to the film and wherein the width of the columns is less than about 50 nm.

2. The phosphor of claim 1, wherein said zinc sulfide phosphor has a crystal grain dimension selected from the group consisting of about 20 nm to about 50 nm, about 30 nm to about 50 nm and about 40 nm to about 50 nm.

3. The phosphor of claim 1, wherein said zinc sulfide phosphor has a sphalerite crystal structure.

4. The phosphor of claim 1, wherein said zinc sulfide phosphor is provided as a thin layer with a thickness of about 0.5 to about 1.0 μm.

5. The phosphor of claim 4, wherein said zinc phosphor is deposited by a method selected from the group consisting of chemical vapour deposition, electron beam deposition and sputtering.

6. The phosphor of claim 5, wherein said phosphor is deposited by a sputtering process comprising;
  depositing said phosphor onto a substrate in an atmosphere comprising argon at a working pressure in the range of about 0.5 to $5 \times 10^{-2}$ torr and an oxygen partial pressure of less than about 0.05 of the working pressure, said substrate maintained at a temperature between ambient temperature and about 300° C., at a deposition rate in the range of about 5 to 100 Angstroms per second, wherein the atomic ratio of the rare earth metal to zinc in the source material is in the range of about 0.5 to 2 percent.

7. An electroluminescent device comprising the phosphor of claim 5 wherein said device comprises;
  a structure and/or substance to minimize or prevent reaction of said fine grained phosphor with oxygen.

8. The electroluminescent device of claim 7, wherein said structure or substance comprises one or more of;
  i) interface modifying layers on one or both sides of the phosphor film to improve the stability of the interface between the phosphor film and the rest of the device;
  ii) a hermetic enclosure for the electroluminescent device; and
  iii) an oxygen getter incorporated into the device.

9. The electroluminescent device of claim 8, wherein said interface modifying layer is selected from a material selected from the group consisting of pure zinc sulfide, hydroxyl ion free alumina, aluminum nitride, silicon nitride and aluminum oxide that is deposited using atomic layer epitaxy.

10. The electroluminescent device of claim 9, wherein said interface modifying layer is silicon nitride.

11. The electroluminescent device of claim 9, wherein said interface modifying layer is pure zinc sulfide.

12. The electroluminescent device of claim 8, wherein said hermetic enclosure is an optically transparent cover plate disposed over said device.

13. The electroluminescent device of claim 12, wherein said cover plate consists of glass.

14. The electroluminescent device of claim 13, wherein said cover plate is sealed with a sealing bead formed using glass frit.

15. The electroluminescent device of claim 13, wherein said sealing bead comprises a polymeric material.

16. The electroluminescent device of claim 8, wherein said hermetic enclosure is an oxygen-impermeable sealing layer deposited over said device.

17. The electroluminescent device of claim 16, wherein said oxygen-impermeable sealing layer is of glass formed from a glass frit composition.

18. A thick film dielectric electroluminescent device comprising;

a thin phosphor layer of formula ZnS:Re, wherein said phosphor layer has a crystal grain size of up to about 50 nm and Re is selected from terbium and europium; and a structure and/or substance to minimize or prevent reaction of the fine grained phosphor with oxygen, wherein said structure or substance comprises one or more of;

i) interface modifying layers on one or both sides of the phosphor film to improve the stability of the interface between the phosphor film and the rest of the device;

ii) a hermetic enclosure for the electroluminescent device; and iii) an oxygen getter incorporated into the device.

19. The device of claim 18, wherein the atomic ratio for terbium or europium to zinc is about 0.005 to 0.02.

20. The device of claim 19, wherein said zinc sulfide phosphor layer has a crystal grain dimension selected from the group consisting of about 20 nm to about 50 nm, about 30 nm to about 50 nm and about 40 nm to about 50 nm.

21. The device of claim 20, wherein said zinc sulfide phosphor layer has a sphalerite crystal structure.

22. The device of claim 20, wherein said zinc sulfide phosphor layer has a thickness of about 0.5 to about 1.0 µm.

23. The device of claim 22, wherein said zinc sulfide phosphor layer is deposited by a method selected from the group consisting of chemical vapour deposition, electron beam deposition and sputtering.

24. The device of claim 23, wherein said structure is deposited by a sputtering process and comprises depositing said phosphor layer onto a substrate in an atmosphere comprising argon at a working pressure in the range of about 0.5 to $5 \times 10^{-2}$ torr and an oxygen partial pressure of less than about 0.05 of the working pressure, said substrate maintained at a temperature between ambient temperature and about 300° C., at a deposition rate in the range of about 10 to 100 Angstroms per second, wherein the atomic ratio of the rare earth metal to zinc in the source material is in the range of about 0.5 to 2 percent.

25. The device of claim 24, wherein said interface modifying layer is selected from a material selected from the group consisting of pure zinc sulfide, hydroxyl ion free alumina, aluminum nitride, silicon nitride and aluminum oxide that deposited using atomic layer epitaxy.

26. The device of claim 25, wherein said interface modifying layer is zinc sulfide.

27. The device of claim 26, wherein said interface modifying layer is silicon nitride.

28. The device of claim 27, wherein said phosphor layer is deposited on a substrate selected from a thick dielectric layer deposited on glass and a thick dielectric layer deposited on ceramic.

29. A thick film dielectric electroluminescent device comprising;

a 0.5 to 1.0 µm thick phosphor layer of formula ZnS:Re, wherein said phosphor layer has a sphalerite crystal structure with a crystal grain size of up to about 50 nm and Re is selected from terbium and europium; and i) interface modifying layers on one or both sides of the phosphor film to improve the stability of the interface between the phosphor film and the rest of the device, wherein said interface modifying layers are comprised of pure zinc sulfide or silicon nitride.

30. The device of claim 29, wherein said device additionally comprises a hermetic enclosure over said device.

31. The device of claim 30, wherein said device additionally comprises an oxygen getter.

* * * * *